United States Patent
Romana et al.

(10) Patent No.: US 9,892,571 B2
(45) Date of Patent: Feb. 13, 2018

(54) DATA PROCESSING UNIT FOR AIRCRAFT UNDERCARRIAGE PERFORMANCE MONITORING

(71) Applicants: AIRBUS OPERATIONS LIMITED, Bristol (GB); AIRBUS OPERATIONS SAS, Toulouse (FR)

(72) Inventors: Louis-Emmanuel Romana, Bristol (GB); Miguel Angel Gama, Bristol (GB)

(73) Assignees: Airbus Operations Limited, Bristol (GB); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/205,127

(22) Filed: Jul. 8, 2016

(65) Prior Publication Data

US 2017/0011568 A1    Jan. 12, 2017

(30) Foreign Application Priority Data

Jul. 8, 2015    (GB) .................................. 1511962.1

(51) Int. Cl.
*G07C 5/08*    (2006.01)
*B64C 25/50*    (2006.01)
(Continued)

(52) U.S. Cl.
CPC .......... *G07C 5/0808* (2013.01); *B60T 8/1703* (2013.01); *B64C 25/10* (2013.01);
(Continued)

(58) Field of Classification Search
CPC .... G07C 5/0808; G07C 5/0816; B64C 25/10; B64C 25/48; B64C 25/50; B60T 8/1703; B60T 2270/406; B64D 2045/0085
(Continued)

(56) References Cited

U.S. PATENT DOCUMENTS 4,007,970 A    2/1977    Romero
4,822,113 A    4/1989    Amberg et al.
(Continued)

FOREIGN PATENT DOCUMENTS

GB    2 411 934    9/2005
GB    2 469 703    10/2010
(Continued)

OTHER PUBLICATIONS

European Search Report cited in EP 16 17 7443 completed Dec. 6, 2016, seven pages.
(Continued)

*Primary Examiner* — Brian P Sweeney (74) *Attorney, Agent, or Firm* — Nixon & Vanderhye P.C.

(57) ABSTRACT

A data processing unit for monitoring the performance of at least one undercarriage which is used for braking and/or steering an aircraft, wherein the data processing unit is configured to: receive data representative of operating characteristics of the undercarriage(s) and use that data to calculate a maximum achievable braking force and/or yaw moment to be generated by the undercarriage(s). Also a method for monitoring the performance of at least one aircraft undercarriage which is used for braking and/or steering an aircraft, the method including: receiving data representative of operating characteristics of the undercarriage(s); and using that data to calculate a maximum achievable braking force and/or yaw moment to be generated by the undercarriage(s).

19 Claims, 6 Drawing Sheets

(51) Int. Cl.
  *B64C 25/48*    (2006.01)
  *B64C 25/10*    (2006.01)
  *B60T 8/17*     (2006.01)
  *B64D 45/00*    (2006.01)

(52) U.S. Cl.
  CPC .............. *B64C 25/48* (2013.01); *B64C 25/50* (2013.01); *G07C 5/0816* (2013.01); *B60T 2270/406* (2013.01); *B64D 2045/0085* (2013.01)

(58) Field of Classification Search
  USPC .......................................................... 701/41
  See application file for complete search history.

(56) References Cited

U.S. PATENT DOCUMENTS

| | | | |
|---|---|---|---|
| 5,511,863 | A | 4/1996 | Suh |
| 2004/0069902 | A1 | 4/2004 | Park |
| 2006/0293805 | A1 | 12/2006 | Garcia |
| 2007/0032919 | A1 | 2/2007 | Giazotto |
| 2007/0132311 | A1 | 6/2007 | Giazotto |
| 2007/0265739 | A1 | 11/2007 | Griffith |
| 2008/0030073 | A1 | 2/2008 | Goodman et al. |
| 2008/0154445 | A1 | 6/2008 | Goodman et al. |
| 2009/0132140 | A1 | 5/2009 | Gowan et al. |
| 2009/0210126 | A1 | 8/2009 | Dellac et al. |
| 2010/0013296 | A1 | 1/2010 | Raby et al. |
| 2010/0106347 | A1 | 4/2010 | Cahill |
| 2010/0185376 | A1 | 7/2010 | Onfroy |
| 2010/0250028 | A1* | 9/2010 | DeVlieg .............. B60T 8/1703 701/3 |

FOREIGN PATENT DOCUMENTS

| | | |
|---|---|---|
| JP | 2010-247788 | 11/2010 |
| WO | 03/072408 | 9/2003 |
| WO | 03/104057 | 12/2003 |
| WO | 2005/002938 | 1/2005 |
| WO | 2005087563 | 9/2005 |
| WO | 2008/040889 | 4/2008 |
| WO | 2012/021179 | 2/2012 |
| WO | 2014/076485 | 5/2014 |

OTHER PUBLICATIONS

Search Report cited in GB Patent Application No. 1511962.1, dated Dec. 18, 2015, four pages.

* cited by examiner

| Variable | Description | Units |
|---|---|---|
| $BG$ | Measured Brake Gain | Nm/Bar |
| $DB_{ACTIVE}$ | DB Activation for Slip Protection | wu |
| $F_{AC}{}^*$ | AC X-Force Command | N |
| $Fx$ | LG Actuation X-Force | N |
| $Fx^*$ | X-Force Command for ATA32 | N |
| $Fx,y,z_M$ | MLG X-, Y-, or Z-Force | N |
| $Fx,y,z_N$ | NLG X-, Y-, or Z-Force | N |
| $Fx_c$ | Corrected X-Force | N |
| $Fx_{NLG}$ | LG Reaction X-Force | N |
| $Fx_M{}^*$ | MLG X-Force Command | N |
| $Fx_{max}$ | Max X-Force at ATA32-level | N |
| $Fy_N{}^*$ | NLG Y-Force Command | N |
| $Fy_{N\_max}$ | Max NLG Y-Force due to Slip Protection | N |
| $BSCS_{Status}$ | BSCS operating status | wu |
| $Mz$ | LG Actuation Z-Moment | Nm |
| $Mz^*$ | Z-Moment Command for ATA32 | Nm |
| $Mz_{AC}{}^*$ | AC Z-Moment Command | Nm |
| $Mz_c$ | Corrected Z-Moment | Nm |
| $Mz_{DB\_max}$ | Max Moment due to DB | Nm |
| $Mz_{MLG}$ | LG Reaction Z-Moment | Nm |
| $Mz_{St\_max}$ | Max Moment due to Steering | Nm |
| $P_{COM}$ | Brake Pressure Command | Bar |
| $P_W$ | Brake Pressure | Bar |
| $r$ | Yaw Rate | deg/s |
| $r^*$ | Yaw Rate Command | deg/s |
| $S_{NW}$ | Nose Wheel Slip Angle | deg |
| $Te_W$ | Brake Temperature | degC |
| $T_{LG}{}^*$ | LG Torque Command | Nm |
| $T_W$ | Braking Torque | Nm |
| $T_W{}^*$ | Brake Torque Command | Nm |
| $U$ | AC Longitudinal Speed | m/s |
| $U^*$ | Speed Command | m/s |
| $U'$ | AC Acceleration | m/s2 |
| $U'^*$ | Acceleration Command | m/s2 |
| $V$ | AC Lateral Speed | m/s |
| $\beta$ | NLG DoT Command | deg |
| $\theta_{NW}$ | Nose Wheel Angle | deg |
| $\theta_{NW}{}^*$ | Nose Wheel Angle Command | deg |
| $\theta$ | Optimisation Coefficients | wu |
| $\kappa$ | Moment Dispatch Coefficient | wu |
| $\kappa_{DB}$ | DB Authority | wu |

FIG. 4

DATA PROCESSING UNIT FOR AIRCRAFT UNDERCARRIAGE PERFORMANCE MONITORING

RELATED APPLICATION

This application claims priority to Great Britain patent application 1511962.1, filed Jul. 8, 2015, the entirety of which is incorporated by reference.

FIELD OF THE INVENTION

The present invention relates to a data processing unit for monitoring the performance of at least one aircraft undercarriage, an aircraft braking and/or steering system, a method for monitoring the performance of at least one aircraft undercarriage and a method for controlling the performance of at least one aircraft undercarriage.

BACKGROUND OF THE INVENTION

A typical aircraft has landing gear comprising a plurality of undercarriages which support the aircraft when it is on the ground. The undercarriages are used to control the movement of the aircraft during ground maneuvers such as landing, taxiing and take off. Some of the undercarriages have braking wheels which are operable to provide a braking force to decelerate the aircraft when a braking torque is applied by a set of brakes. At least one of the undercarriages has a steering wheel which may be rotated to steer the aircraft.

The ability of the aircraft to perform certain ground maneuvers may be limited by the performance envelope of the undercarriages. For example, the ability of the aircraft to perform a braking operation or a steering operation may be limited by the maximum braking force which can be generated by the braking wheels (and by other braking systems, e.g. reverse thrust of the aircraft engines) or the maximum turning moment which can be generated by the steering wheels (and by other steering systems, e.g. differential thrust of the aircraft engines).

The performance envelope of the undercarriages may vary depending on the operating conditions of the undercarriages, for example due to variations in brake gain (the ratio of the brake clamping force to the resultant braking torque), changes in temperature or loading conditions, as well as external conditions such as adverse runway conditions, variations in runway surface and crosswinds. The operability of certain components and systems may also affect the performance envelope. For example, performance may be reduced in the case of tire burst or brake failure or if certain components become excessively worn. It is therefore difficult for a pilot or a control system to determine how to operate the braking and steering systems most efficiently during ground maneuvers.

During ground maneuvers, aircraft undercarriages may experience spike loads significantly greater than those expected during the majority of normal operation of the aircraft. Aircraft undercarriages are generally designed conservatively to withstand these increased loads, leading to a significant increase in aircraft weight and consequently a reduction in fuel efficiency. It is considered desirable to control and limit the loads generated in aircraft undercarriages so that the structural efficiency may be increased, allowing the weight and therefore fuel consumption of the aircraft to be reduced.

It is therefore desirable to provide a steering system for an aircraft which addresses these problems and allows an aircraft to perform ground maneuvers with greater efficiency within the available performance envelope.

SUMMARY OF THE INVENTION

A first aspect of the invention provides a data processing unit for monitoring the performance of at least one undercarriage which is used for braking and/or steering an aircraft, wherein the data processing unit is configured to: receive data representative of operating characteristics of the undercarriage(s); and use that data to calculate a maximum achievable braking force and/or yaw moment to be generated by the undercarriage(s).

A second aspect of the invention provides an aircraft braking and/or steering system for controlling braking and/or steering of at least one undercarriage, the system comprising a data processing unit according to any preceding claim and a braking and/or steering control system adapted to output an output command to at least one brake actuator and/or at least one steering actuator to control the actuation of the brake actuator(s) and/or steering actuator(s).

A third aspect of the invention provides a method for monitoring the performance of at least one aircraft undercarriage which is used for braking and/or steering an aircraft, the method comprising the steps of: receiving data representative of operating characteristics of the undercarriage(s); and using that data to calculate a maximum achievable braking force and/or yaw moment to be generated by the undercarriage(s).

A fourth aspect of the invention provides a method for controlling the performance of at least one aircraft undercarriage comprising the steps of monitoring the performance of the undercarriage(s) is accordance with the third aspect of the invention and using the calculated maximum achievable braking force and/or yaw moment to control or limit an output command to at least one brake actuator and/or at least one steering actuator to control the actuation of the brake actuator(s) and/or steering actuator(s).

The invention is advantageous in that it provides a prediction of the aircraft's current performance envelope during ground maneuvers. This information may be useful to allow effective and efficient control of the aircraft, for example by enabling an operator or a control system to evaluate the performance limitations of the aircraft before commencing a ground manoeuvre. Ground maneuvers may, therefore, be planned according to the aircraft's current performance envelope and braking and/or steering performance may be maximised within the available performance envelope.

The data processing unit may be configured to use the data representative of the operating characteristics of the undercarriage(s) to calculate the total braking force and/or yaw moment being generated by the undercarriage(s). This information may be useful for improving crew and control system awareness of undercarriage loading and may be used to control or limit undercarriage loading so that design requirements and therefore weight of the undercarriages may be reduced.

The data representative of the operating characteristics of the undercarriage(s) may include data relating to a) the vertical and/or longitudinal and/or lateral loading of the or each undercarriage and/or b) braking torque and/or steering angle of at least one wheel of the undercarriage(s) and/or c) braking pressure and/or temperature of at least one brake of the undercarriage(s). Longitudinal loading means loading in a direction parallel to a longitudinal axis of the aircraft.

Transverse loading means loading in a direction perpendicular to the longitudinal axis and the vertical direction. The data representative of the operating characteristics may include data representative of other characteristics of the undercarriage(s) or the aircraft or its surroundings.

The data representative of the operating characteristics of the undercarriage(s) may comprise data output by one or more sensor(s) used to measure the operating characteristics of the undercarriage(s), preferably data generated and output by the sensor(s) in real time. By using data generated in real time, the data processing unit may update the calculated values for the maximum achievable braking force and/or yaw moment during ground maneuvers.

The calculated maximum achievable braking force and/or yaw moment may be used to control or limit the output command of the braking and/or steering system.

By limiting an output command, the braking and/or steering system may control or limit the loading of the undercarriage(s), so that the design requirements and therefore the weight of the undercarriages may be reduced. By limiting the command using a maximum available braking force or yaw moment, the data system may maximise braking or turning performance without saturating the undercarriages performance capability.

The braking and/or steering control system may be configured to output the output command in response to an input command, and the calculated maximum achievable braking force and/or yaw moment may be used to control or limit the input command.

The input command may comprise a deceleration or braking force command and/or a yaw rate or yaw moment command. Alternatively, the input command may be any input signal to a braking and/or steering control system for controlling operation of one or more braking wheels and/or steering wheels.

The braking and/or steering control system may be configured to control or limit the input command in combination with a deceleration controller and/or a yaw rate controller. The deceleration controller may be configured to receive an acceleration command and output a force command corresponding to the commanded deceleration. The yaw rate controller may be configured to receive a yaw rate command and output a yaw moment command corresponding to the commanded yaw rate.

The output command may comprise a braking pressure command and/or a steering angle command and/or a command to any other system used to control deceleration and/or yaw rate, for example a command to an engine or control surface.

The braking and/or steering control system may be configured to determine the operability of at least one undercarriage component and/or system and/or the validity of any of the data representative of the operating characteristics of the undercarriage(s). The operability of a component or system means whether or not that component or system is operating as would normally be expected, for example whether or not a brake actuator is operating a brake as expected to generate a braking force or whether or not a steering actuator is controlling the angular position of a steering wheel to generate a lateral force as expected.

By determining the operability of undercarriage components and/or systems, the braking and/or steering control system may increase aircraft crew and/or control system awareness of failures which may affect performance so that appropriate action may be taken.

The braking and/or steering control system may use the determination of the operability of the undercarriage component(s) and/or system(s) in calculating the maximum achievable braking force and/or yaw moment. The data processing unit may, therefore, consider performance limitations of the undercarriages in failure modes and calculate an accurate maximum achievable braking force and/or yaw moment. The control system may, therefore, be used to maximise braking and/or steering efficiency, limit undercarriage loading and plan ground maneuvers in failure modes.

The data processing unit may be configured to generate or receive alternative data representative of at least one of the operating characteristics of the undercarriage(s) if any data representative of at least one of the operating characteristics is determined to be invalid, and to use the alternative data in the place of the invalid data when calculating the maximum achievable braking force and/or yaw moment. The sensitivity of the data processing unit and braking and/or steering control system to sensor failures is therefore reduced.

The alternative data representative of at least one of the operating characteristics of the undercarriage(s) may be generated by consulting a look-up table. Alternatively, alternative data may be generated using a different method, for example by selecting the last valid data received for an undercarriage operating characteristic, or by selecting a saved value from a memory, or by selecting a default value, or by selecting a value outputted by another sensor The braking and/or steering control system may further comprise a memory for storing data representative of operating characteristics of the undercarriage(s), and the data processing unit may be configured to use the stored data in the place of the received data representative of operating characteristics of the undercarriage(s) if the received data is determined to be invalid.

The braking and/or steering control system may be configured to provide information relating to the operability of any undercarriage component or system and/or the validity of any of the data representative of operating characteristics of the undercarriage(s) to one or more persons and/or systems external to the data processing unit. The aircraft crew and/or control systems may therefore be made aware of failures which may affect ground maneuvers and can modify their actions accordingly.

The data processing unit may form part of a closed loop system for controlling braking and/or steering of the undercarriage(s). The data processing unit may therefore be used to optimise command signals and/or to minimise the error between a command signal and a measured value to improve the efficiency and accuracy of the braking and steering control system.

The braking and/or steering control system may be configured to output a plurality of signals for independently controlling the operation of a plurality of brake actuators and/or steering actuators. Alternatively, the braking and/or steering control system may output control signals to only one actuator.

The data processing unit may be enabled or disabled without disrupting the operation of at least one brake and/or at least one steering system.

The data processing unit may form part of an integrated braking and steering control system. Alternatively, the data processing unit may be part of a braking control system or a steering control system, and may or may not be used to provide feedback for controlling operation of the undercarriage(s).

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
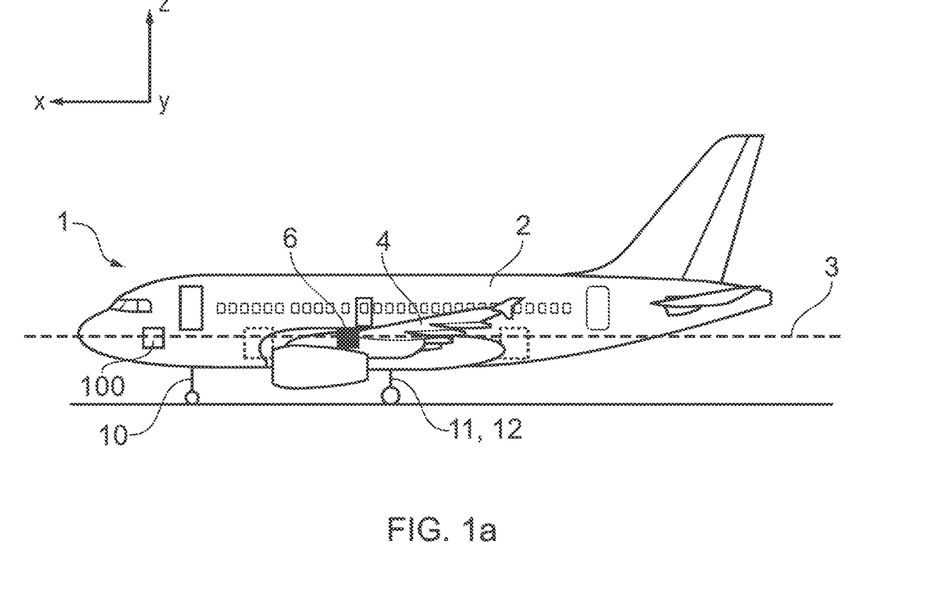
FIGS. 1a and 1b show an aircraft.
Figure 1B:
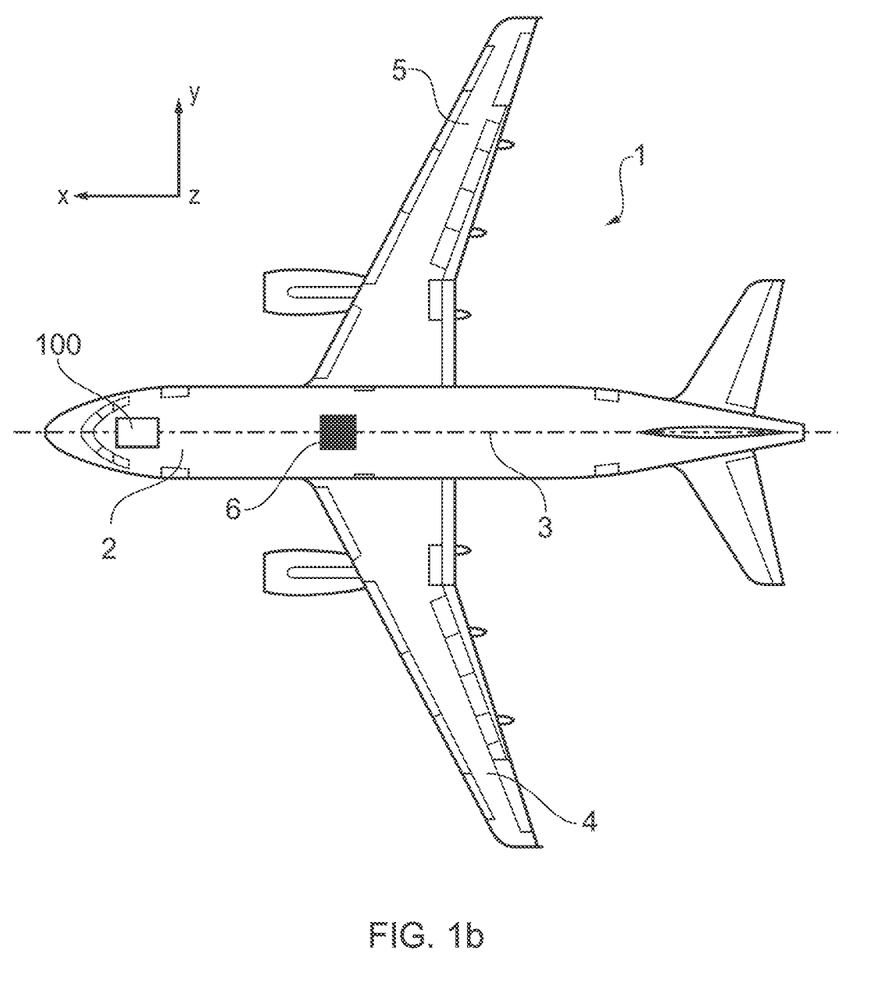

FIGS. 1a and 1b show an aircraft 1 having a fuselage 2 with a longitudinal axis 3 and wings 4, 5 extending outwardly from the fuselage. The aircraft 1 defines a set of axes with a longitudinal x direction parallel to the longitudinal axis of the aircraft, a lateral y direction perpendicular to the x axis, and a vertical z direction perpendicular to the x and y axes. The aircraft 1 has a centre of gravity 6.

The aircraft has landing gear which supports the aircraft when it is on the ground and controls the movement of the aircraft during ground maneuvers such as landing, taxiing and take off. The landing gear comprises a nose landing gear (NLG) undercarriage 10 and port and starboard main landing gear (MLG) undercarriages 11, 12. The landing gear may be retracted when the aircraft 1 is in flight and extended before landing.

Figure 1C:
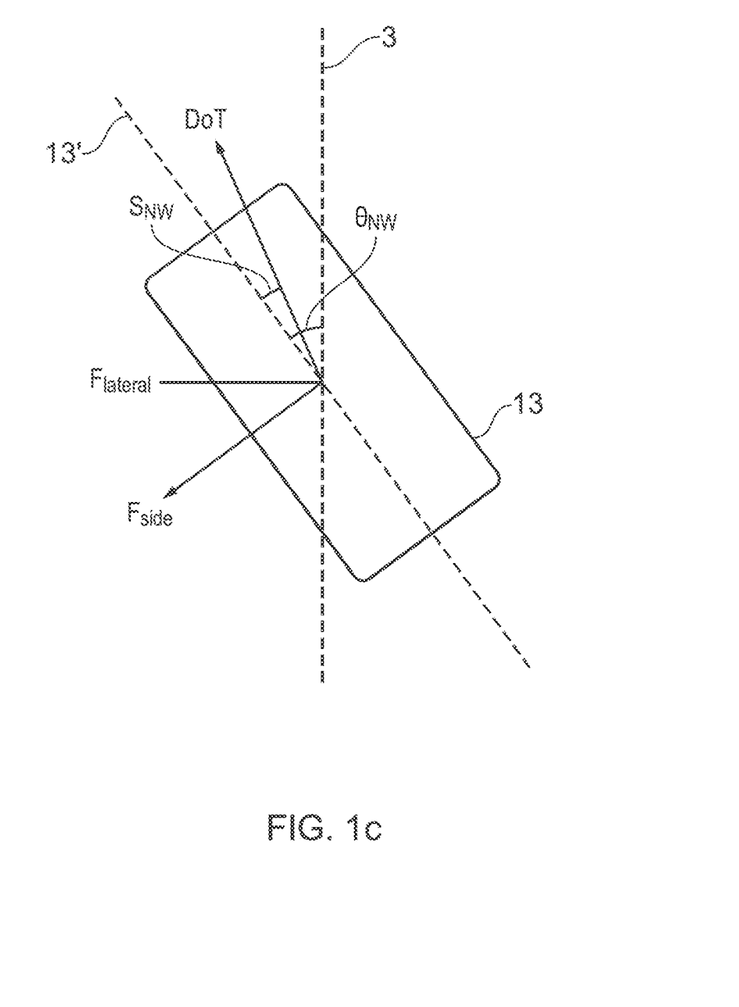
FIG. 1c shows a plan view of a steerable nose landing gear.

The NLG undercarriage 10 has a pair of steering wheels 13 which may be rotated by a steering actuator to steer the aircraft. The nose wheel angle $\theta_{NW}$ is defined as the angle between the direction in which the steering wheels are facing 13' (that is the direction in which the wheels roll in a direction perpendicular to the axis of rotation) and the longitudinal axis 3 of the aircraft 1, as indicated in FIG. 1c. The direction of travel of the aircraft (DoT) is defined as the direction of the speed vector of the NLG undercarriage 10 with respect to the longitudinal axis 3 of the aircraft 1. The nose wheel angle $\theta_{NW}$ may be varied to control the direction of travel of the NLG undercarriage 10, thereby controlling the heading of the aircraft.

When the steering wheels 13 are not aligned with the DoT, an angle known as the nose wheel slip angle $S_{NW}$ is created between the direction in which the steering wheels 13 are facing 13' and the DoT. When the steering wheels 13 are operated with a slip angle, a side force $F_{side}$ having a lateral component $F_{lateral}$ (in the y direction) is generated which results in a turning moment or yaw moment which acts to turn the aircraft. The net turning moment being generated in a particular direction may, therefore, be increased or decreased by applying a slip angle.

The MLG undercarriages 11, 12 each have a plurality of braking wheels 14 which may be operated to decelerate the aircraft. Each braking wheel is operated by using a brake actuator to apply a clamping force to a stack of carbon brake disks (stators and rotors) which transfers a braking torque to the braking wheel, resulting in a longitudinal deceleration force being transferred to the aircraft 1. The longitudinal braking force generated by each braking wheel may be controlled by operating the actuators to control the brake pressure of each brake. The brakes used in the embodiment described below may have a hydraulic brake actuator but a skilled person would appreciate that a similar control system using corresponding control methods could be employed regardless of the type of brakes, and could, for example be applied to an aircraft having electromechanical brake actuation and/or regenerative brakes.

In addition, the braking wheels may be used to help steer the aircraft through differential braking. Differential braking (DB) is the intentional application of unbalanced braking forces either side of the aircraft center line 3 to generate a net yaw moment to steer the aircraft. DB may conventionally be achieved by asymmetric deflection of a pair of brake control devices for controlling port and starboard braking undercarriages. Braking and steering operations may also be assisted by other systems, for example spoilers and other control surfaces and the aircraft's engines.

The aircraft 1 includes a cockpit device for longitudinal control which is used to control deceleration of the aircraft and which outputs signals representative of a desired speed or deceleration, i.e. a speed command U* or a deceleration command U'*. The aircraft 1 also includes a cockpit device for lateral control which is used to steer the aircraft and which outputs signals representative of a desired direction of travel (DoT) and yaw rate, i.e. a DoT command β and a yaw rate command r*.

Figure 2:
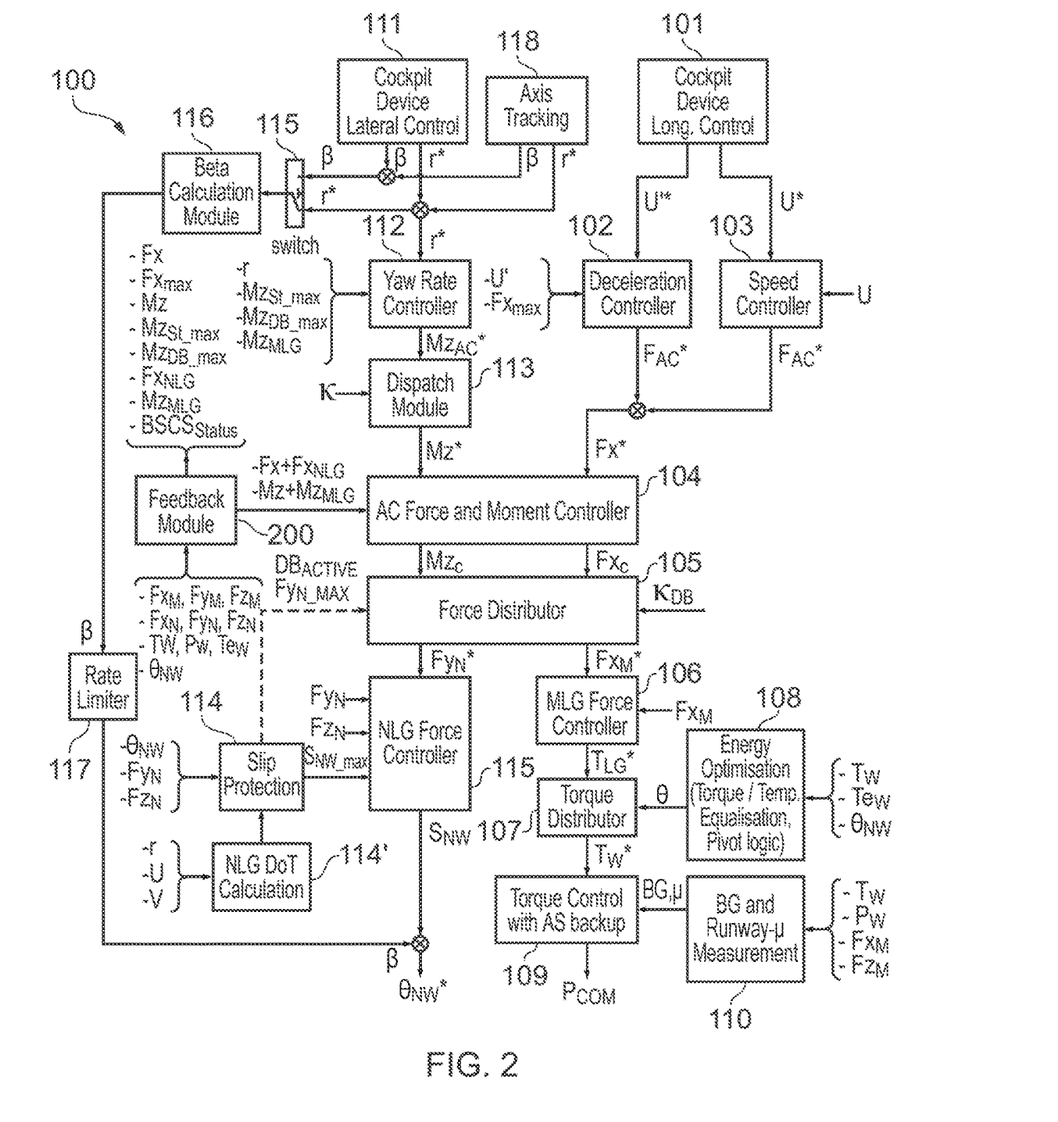
FIG. 2 shows a braking and steering control system.
Figure 3:
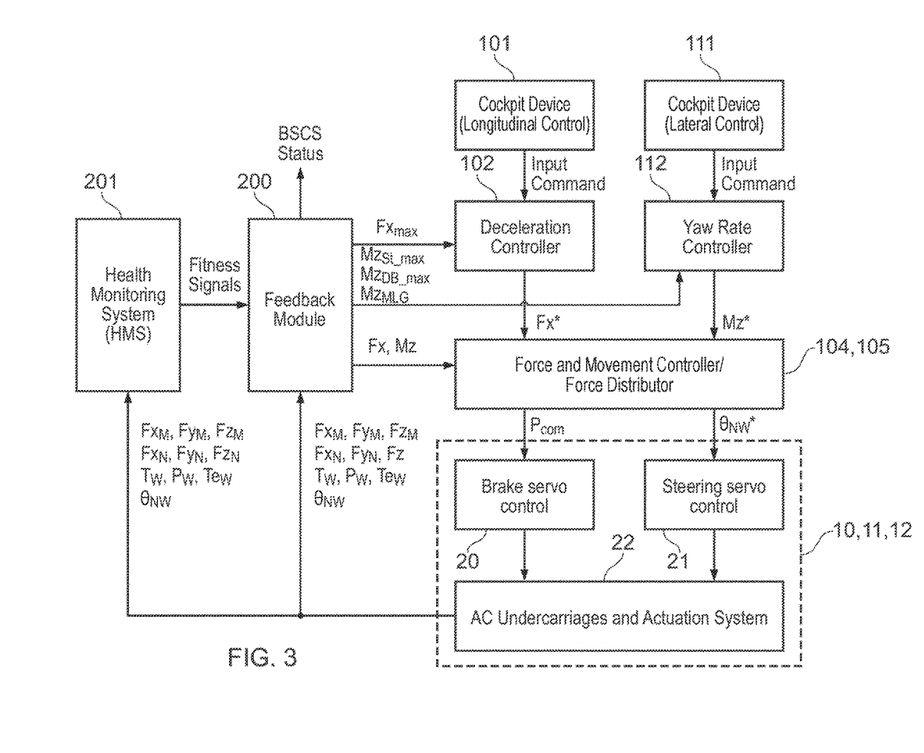
FIG. 3 shows a part of the steering and control system of FIG. 2.
Figure 4:
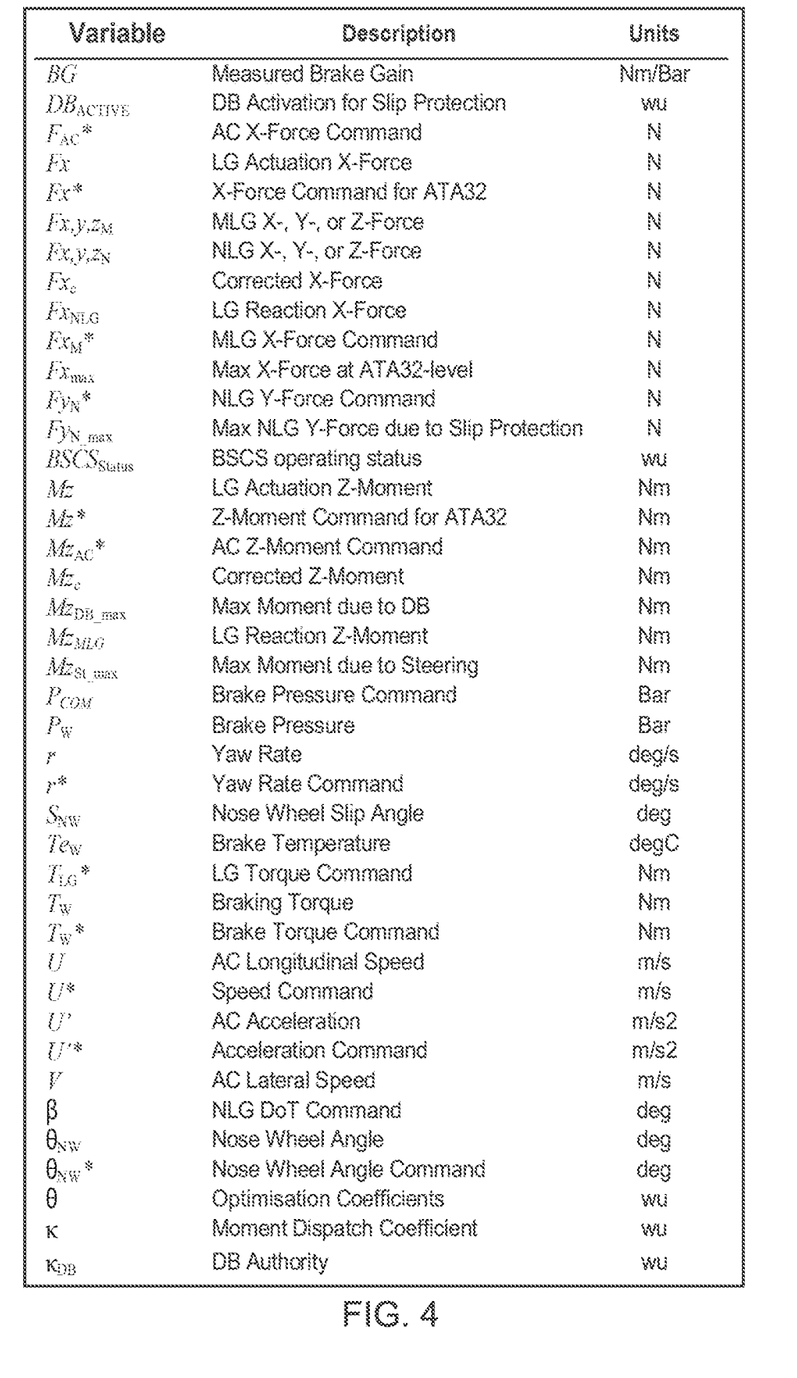
FIG. 4 is a table of symbols used in FIGS. 2 and 3.

FIG. 2 shows a braking and steering control system 100 of the aircraft 1 having a data processing unit or feedback module in accordance with an embodiment of the invention. FIG. 3 shows a simplified view of a part of the braking and steering control system with a feedback module or data processing unit in one possible embodiment of the invention. The skilled person will appreciate that the functionality and advantages of the feedback module are not dependent on the specific features of the aircraft 1 and the braking and steering control system 100, and that a similar feedback module may equally be used to monitor the performance of any aircraft undercarriage(s) used for braking and/or steering.

The braking and steering control system 100 is generally configured to receive input commands representative of a desired speed U*, deceleration U'*, DoT β or yaw rate r* and to transmit output commands—brake pressure command, $P_{COM}$, and nose wheel angle command, $\theta_{NW}$*—to braking and steering actuators to control the operation of the braking and steering wheels to control movement of the aircraft 1 in accordance with the input commands.

Each deceleration command U'* outputted by the longitudinal control device 101 is received by a deceleration controller 102 which also receives data representative of the current aircraft deceleration (negative acceleration) U' and the maximum achievable braking force $Fx_{max}$ to be generated by the MLG undercarriages 11, 12 from a feedback module 200. The deceleration controller 102 uses this data to determine the longitudinal braking force required to achieve the commanded deceleration for the aircraft 1 and outputs this value as a longitudinal force command $F_{AC}$*.

Each speed command U* outputted by the longitudinal control device 101 is similarly received by a speed controller 103 which also receives data representative of the current aircraft speed U. The speed controller 103 applies a speed control law to convert the speed command U* to a longitudinal force command $F_{AC}$* which is representative of the longitudinal braking force required to achieve or maintain the commanded speed for the aircraft 1 and outputs the longitudinal force command.

The longitudinal force command $F_{AC}$* (originating either as an acceleration command or a speed command) is received by an aircraft force and moment controller 104 as an x direction force command Fx*. The aircraft force and moment controller 104 also receives data representative of the longitudinal braking force Fx and the NLG x-direction reaction force $Fx_{NLG}$ from a feedback module 200. The force and moment controller 104 uses the current MLG undercarriage longitudinal forces to apply a correction to the x direction force command Fx*, and outputs a corrected force command $Fx_c$.

The corrected force command $Fx_c$ is received by a force distributor 105 which divides the total corrected force command into two MLG braking force commands $Fx_M^*$, one for each of the two MLG undercarriages 11, 12, and outputs the MLG braking force commands to the MLG undercarriages. For clarity, FIG. 1 only shows one of the MLG force commands $Fx_M^*$ being outputted to one of the MLG undercarriages, however each of the MLG undercarriages 11, 12 have similar control system elements downstream of the force distributor 105 and function similarly.

Each MLG undercarriage 11, 12 has a MLG force controller 106 which receives the MLG braking force command $Fx_M^*$ from the force distributor 105 and a MLG longitudinal force signal $Fx_M$ representative of the longitudinal force currently generated by that MLG undercarriage $Fx_M$ from a landing gear load sensor (e.g. a strain gauge). The MLG force controller 106 uses the braking force command $Fx_M^*$ and the current longitudinal force $Fx_M$ to determine the total braking torque to be generated at the braking wheels 14 of that undercarriage to achieve the commanded longitudinal force, and outputs a landing gear torque command $T_{LG}^*$ representative of the total braking torque to be generated by the braking wheels 14 of that undercarriage.

The landing gear torque command $T_{LG}^*$ is received by a torque distributor 107 which also receives optimisation coefficients θ for each braking wheel 14 from a braking energy optimiser 108. The torque distributor 107 uses the overall torque command for that undercarriage $T_{LG}^*$ and the torque coefficients θ for each braking wheel 14 to determine a braking torque to be generated by each wheel and outputs a wheel specific brake torque command $T_W^*$ to each braking wheel of the undercarriage which is representative of the braking torque to be generated by that braking wheel. For clarity, FIG. 1 only shows one-wheel brake torque command $T_W^*$ being transmitted to one of the braking wheels 14, although each braking wheel of each MLG undercarriage receives a respective wheel brake torque command $T_W^*$ and is operated similarly.

Each braking wheel has a torque controller 109 and a brake gain and runway friction measurement unit 110 which calculates BG and the tyre-runway friction coefficient using input signals from various landing gear sensors. Each torque controller 109 receives the torque command intended for its wheel from the force controller 106 and signals representative of measured brake gain BG and tyre-runway friction μ from the brake gain and runway friction measurement unit 110 and determines a brake pressure required to achieve the commanded braking torque for its braking wheel 14. Each torque controller 109 then outputs a brake pressure command $P_{COM}$ representative of the desired brake pressure to the brake actuator for its wheel. The torque controller 109 has anti-skid functionality to reduce or eliminate skidding by limiting the brake pressure command $P_{COM}$ if the wheel begins to skid.

The brake pressure commands $P_{COM}$ for each braking wheel 14 are received by brake servo controllers for the brake actuators for each respective braking wheel, causing the brake actuators to apply pressure to the brakes in accordance with the brake pressure commands $P_{COM}$, thereby decelerating the aircraft 1.

Each yaw rate command r* outputted by the lateral control device 111 is received by a yaw rate controller 112 which also receives data representative of the current aircraft yaw rate r, the maximum achievable turning moment to be generated by steering using the steering wheels $Mz_{St\_max}$, the maximum achievable turning moment to be generated by differential braking $Mz_{DB\_max}$ and the MLG reaction moment $Mz_{MLG}$ (ie reaction moment from the MLG undercarriages 11, 12 to changes in yaw) from the feedback module 200. The yaw rate controller 112 uses this data to determine a yaw moment about the z axis which is required to achieve the commanded yaw rate for the aircraft 1, and outputs an aircraft yaw moment command $Mz_{AC}^*$ representative of the required yaw moment.

The aircraft yaw moment command $Mz_{AC}^*$ is received by a dispatch module 113 which also receives a moment dispatch coefficient κ representative of the operating conditions of the runway and/or the aircraft. The dispatch coefficient may be used to apply a correction factor or a limit to the yaw moment command $Mz_{AC}^*$. The dispatch module outputs a z moment command Mz* representative of the desired yaw moment to be generated by the landing gear.

The z moment command Mz* is received by the aircraft force and moment controller 104 which also receives data representative of the yaw moment due to steering Mz and the yaw moment reaction force from the MLG undercarriages $Mz_{MLG}$ from the feedback module 200. The force and moment controller 104 uses the current aircraft turning moment to apply a correction to the z moment command Mz*, and outputs a corrected turning moment command $Mz_c$.

The corrected turning moment command $Mz_c$ is received by the force distributor 105 which also receives a signal representative of the maximum achievable lateral force $Fy_{N\_max}$ to be generated by the NLG undercarriage from a slip protection module 114. The slip protection module 114 receives signals representative of the nose wheel angle $\theta_{NW}$, NLG lateral force $Fy_N$ and NLG-ground reaction force $Fz_N$, as well as a signal representative of the DoT from a NLG DoT calculation module 114', which calculates the current DoT based on the current aircraft yaw rate r, longitudinal speed U and lateral speed V. The force distributor 105 outputs a NLG lateral force command $Fy_N^*$ representative of the lateral force (in the y direction) to be generated by the NLG undercarriage 10. The force distributor 105 also receives a DB activation signal $DB_{ACTIVE}$ from the slip protection module to activate differential braking if this is determined to be required, for example if the commanded turning moment cannot be achieved by steering alone. If differential braking is determined to be desirable, the force distributor 105 outputs an MLG lateral force command to the MLG undercarriages to activate differential braking. The force distributor 105 also receives a DB authority signal $\kappa_{DB}$ for confirming whether or not DB may occur, so that the activation of DB may be controlled by a pilot or co-pilot or another control system.

The NLG lateral force command $Fy_N^*$ is received by a NLG force controller 115 which also receives data representative of the normal reaction force between the steering wheels 13 and the runway $Fz_N$ (ie force in the z direction) and the current lateral steering force $Fy_N$ (ie force in the y direction). The NLG force controller 115 uses this data to calculate a required slip angle to generate the commanded NLG lateral force $Fy_N^*$ and outputs a slip angle command $S_{NW}$. The NLG force controller 115 also receives data representative of the maximum slip angle $S_{NW\_max}$ to avoid skidding of the steering wheels 13 from the slip protection module 114 and limits the outputted slip angle command $S_{NW}$ if it exceeds the maximum slip angle $S_{NW\_max}$.

When the lateral control device 111 outputs a DoT command β and a yaw rate command r*, the commands pass through a switch 115 which is used to select either the DoT command β or the yaw rate command r*. If the yaw rate command r* is selected a beta calculation module 116 calculates a DoT command β based on the inputted yaw rate command r* to achieve the desired yaw rate. If the DoT command β is selected the DoT command bypasses the beta calculation module 116 and is not changed. The DoT command β (originating either as DoT command or a yaw rate command from the lateral control device) then passes through a rate limiter 117 which acts to limit the rate of change of the DoT command.

The limited DoT command β and the slip angle command $S_{NW}$ outputted by the NLG force controller 115 are then combined to give a nose wheel angle command $\theta_{NW}^*$ representative of the desired nose wheel angle. The nose wheel angle command $\theta_{NW}^*$ is received by a steering servo controller for the steering actuator which sets the nose wheel angle to steer the aircraft 1.

An axis tracking module 118 is also provided which may be used to automatically output a DoT command β and a yaw rate command r* when the pilot requests automatic steering of the aircraft 1 to a desired location. The DoT command β and a yaw rate command r* outputted by the tracking module 118 are used in the same way as the equivalent commands from the lateral control device 111 as discussed above.

The functionality of the feedback module 200 and its interaction with other elements of the braking and steering control system 100 as shown in FIG. 3 will now be described in more detail. For clarity FIG. 3 does not include all of the elements shown in FIG. 2, and includes the force and moment controller 104, the force distributor 105 and all subsequent control blocks in a single block. FIG. 3 includes all of the aircraft undercarriages 10, 11, 12 in a single block representing all of the landing gear and shows only one brake pressure command $P_{COM}$ being sent to one brake servo control 20 and one nose wheel angle command $\theta_{NW}^*$ being sent to one steering servo control 21 controlling the undercarriages' actuation systems 22, however, each brake associated with a braking wheel receives its own pressure command as described above to its respective servo control. FIGS. 2 and 3 illustrate one embodiment of the invention although other embodiments are envisaged.

The feedback module 200 is a data processing unit which is adapted to process data relating to the operating characteristics of the landing gear during ground maneuvers and generate data representative of the current performance of the landing gear and the maximum available performance of the landing gear. This data is then fed back to the braking and steering control system 100 and used to control operation or the braking and steering wheels. In this embodiment the feedback module 200 is adapted to cooperate with a health monitoring system (HMS) 201, although the HMS is not essential to the basic functionality of the feedback module.

The NLG undercarriage 10 and the MLG undercarriages 11, 12 are provided with a plurality of sensors which measure various operating characteristics of the undercarriages, including longitudinal (x direction), lateral (y direction) and vertical (z direction) loading of the NLG and MLG undercarriages ($Fx_N$, $Fy_N$, $Fz_N$, $Fx_M$, $Fy_M$, $Fz_M$), the nose wheel angle ($\theta_{NW}$), the braking torque ($T_W$) of each braking wheel 14 and the brake pressure ($P_W$) and brake temperature ($T_W$) of each brake. For example, the sensors may include strain gauges, torque sensors, position sensors, etc. The sensors transmit signals representative of the measured operating characteristics of the undercarriages 10, 11, 12 to the feedback module 200 and to the HMS 201. The sensors transmit their signals in real time to provide up to date information about the current operation of the undercarriages.

The HMS 201 is configured to determine the operability of the brake actuators of the MLG undercarriages 11, 12 and the steering actuator of the NLG undercarriage 10. The HMS is also configured to determine the validity of the signals representative of the operating characteristics of the undercarriages received from the sensors. In one embodiment the HMS 201 makes its determinations by performing correlation analysis on the data received form the sensors. The correlation analysis compares measured quantities in order to establish the probability that a linear relationship exists between the two quantities, indicating whether or not the measured quantities are within a moving range of acceptable values according to an expected correlation. By using a plurality of correlating loops, the probability of an error due to a sensor failure or noise contamination of data is reduced.

If a component which is essential to operation of a particular braking wheel such as a brake actuator, a brake, a wheel or a tyre fails, the correction analysis will indicate that the actuator for that braking wheel is not functioning in an expected manner (i.e. is not operating its brake to generate a braking force as would normally be expected) and report that the actuator is not fit for normal operation. Similarly, if a component which is essential to operation of a particular steering wheel such as a steering actuator, a steering linkage, a wheel or a tyre fails, the correction analysis will indicate that the actuator for that steering wheel is not functioning in an expected manner (i.e. is not controlling the angular position of the wheel as would normally be expected) and report that the actuator is not fit for normal operation.

If a sensor is not functioning correctly, for example if it is transmitting an incorrect signal which is not representative of an undercarriage operating characteristic or is transmitting no signal, the correction analysis will establish that the sensor is not transmitting a signal falling within a moving range of acceptable values. The HMS 201 will then indicate the sensor is not fit for normal operation and that its signals are not valid.

The HMS 201 transmits its determinations relating to the fitness of the braking and steering actuators and the validity of the signals representative of the operating characteristics of the undercarriages to the feedback module 200.

If the HMS 201 indicates that any of the signals representative of one of the operating characteristics of one of the undercarriages are not valid, the feedback module 200 generates alternative data to replace the data which is determined to be invalid by consulting a look-up table. Similarly, if a signal representative of an operating characteristic of one of the undercarriages is not received by the feedback module 200, feedback module generates alternative data to use in the place of the data which was not received. The feedback module 200 can therefore identify inaccurate or missing data and replace the inaccurate or missing data with suitable replacement data. In this way the sensitivity of the feedback module to sensor failures is reduced.

The feedback module 200 has access to a basic geometric model of the aircraft 1. The geometric model includes the number of undercarriages and their respective locations with respect to the aircraft center of gravity 6, as well as the number of braking actuators/braking wheels 14 of each MLG undercarriage and the number of steering actuators/steering wheels 13 of the NLG undercarriage. The information provided by the geometric model allows the feedback module 200 to establish which wheels are contributing to a braking and/or steering operation and how the forces generated at each undercarriage will affect the aircraft.

The feedback module 200 uses the data representative of the operating characteristics of the MLG undercarriages 11, 12 and the geometric model of the aircraft to calculate a value representative of the maximum available braking force $Fx_{max}$ from each of the MLG undercarriages 11, 12, that is the maximum total longitudinal force in the x direction which may be generated by operating the brake actuators to generate a braking force at each braking wheel 14.

The feedback module 200 uses the data representative of the operating characteristics of the NLG undercarriage 10 and the geometric model of the aircraft to calculate a value representative of the maximum available yaw moment due to steering $Mz_{Zt\_max}$, that is the maximum yaw moment about the z axis relative to the center of gravity 6 of the aircraft 1 which may be generated by steering the steering wheels 13. The feedback module 200 uses the location of the steering wheels 13 relative to the aircraft center of gravity 6 to determine the turning moment generated by the longitudinal (x direction) and lateral (y direction) forces generated by steering.

The feedback module 200 also uses the data representative of the operating characteristics of the MLG undercarriages 11, 12 to calculate a value representative of the maximum available yaw moment due to differential braking $Mz_{DB\_max}$ from the MLG undercarriages.

The feedback module 200 takes account of the fitness of the brake actuators and the steering actuator (as reported by the HMS 201) when calculating the maximum available braking forces and yaw moments. For example, if the HMS 201 indicates that all braking and steering actuators are functioning correctly, the feedback module will include the forces generated by braking each of the braking and steering wheels in its calculations. If, however, the HMS indicates that one or more actuators are not fit for normal operation, the feedback module 200 will ignore the force contribution of any wheel(s) which are dependent on those actuator(s) to develop a longitudinal and/or lateral force to decelerate and/or steer the aircraft. By including the health status of braking and steering system components in its calculations, the feedback module 200 can accurately predict the performance envelope of the undercarriages 10, 11, 12 taking failures into account, so that the performance envelope may be accurately predicted even in failure modes.

The maximum available braking force and yaw moment which may be generated by the landing gear may vary dynamically as the aircraft is operated. By using data from the undercarriages, the feedback module 200 is able to generate an accurate estimate of the current performance envelope the aircraft 1. By using data generated in real time, the predicted performance envelope model may update itself as operating conditions of the undercarriages 10, 11, 12 change during ground maneuvers.

Generally, the maximum available braking force and yaw moment calculated by the feedback module are outputted by the feedback module and used to control and limit commands being outputted by a braking and steering control system. In this way the performance of the aircraft may be controlled according to a predicted performance envelope, for example to maximize the efficiency of a braking or steering operation, to prevent saturation of the actuation capabilities of braking and/or steering actuators and to control loading of aircraft undercarriages.

The feedback module 200 transmits a signal representative of the maximum available braking force $Fa_x$ to the deceleration controller 102. The deceleration controller 102 uses the maximum available braking force $Fa_x$ to limit the outputted longitudinal force command $F_{AC}*$ so that the deceleration controller does not request a braking force from the MLG undercarriages 11, 12 which is beyond the available performance envelope of the undercarriages. The feedback module 200 also transmits signals representative of the maximum available yaw moment due to steering $Sy_{stemax}$ and the maximum available yaw moment due to differential braking $Ma_{dman}$ to the yaw rate controller 112. The yaw rate controller 112 uses the maximum available yaw moment $Sy_{stemax}+Ma_{dman}$ to limit the outputted aircraft turning moment command $Za_c*$ so that the yaw rate controller does not request a yaw moment which is beyond the available performance envelope of the undercarriages.

By calculating the aircraft's current performance envelope and limiting the braking and steering commands to the maximum values permitted within that envelope, the feedback module 200 ensures that the undercarriages 10, 11, 12 perform braking and steering operations with maximum efficiency. Performance may be enhanced by ensuring the maximum possible braking force or yaw moment is generated by the landing gear in normal, failing and degraded conditions without saturating the performance capabilities of the undercarriages.

The closed loop control provided by the calculated maximum permitted values also acts to limit loading of the undercarriages without sacrificing maximum braking and turning performance so that the design requirements and therefore the weight of the undercarriages may be reduced and the fuel efficiency increased. This advantage may be of particular benefit in failure modes when the loading of some undercarriage components may be increased.

The ability of the feedback module 200 to adapt its calculations in degraded conditions and failure modes to account for reduced performance ensures that the braking and steering control system functions to the best of its ability even when performance is impaired.

By calculating the available yaw moment from steering and the available yaw moment from differential braking, the braking and steering control system 100 may be informed of the total yaw moment which may be achieved by steering and braking in combination. The yaw moment generated during any turning maneuver may, therefore, be limited by the maximum possible yaw moment, and is not restricted by the individual performance limitations or either the NLG undercarriage 10 or the MLG undercarriages 11, 12 alone. The turning efficiency of the aircraft 1 is, therefore, maximized, and the ability of the steering and braking systems to cooperate is enhanced, especially in failure modes when efficient control of the aircraft 1 may be more difficult.

The feedback module 200 also uses the data representative of the operating characteristics of the undercarriages to generate values representative of the longitudinal forces $Fi_{nn}$, FM and the yaw moments Mz about the z axis currently being applied to the aircraft 1 by each of the undercarriages 10, 11, 12. The feedback module 200 transmits signals representative of the total longitudinal force (including the braking force Fx and the NLG undercarriage x-direction reaction force $Fx_{NLG}$) and yaw moment (including the steering moment Mx and the MLG undercarriage z-moment reaction force $Mz_{MLG}$) in a feedback loop.

The aircraft force and moment controller 104 uses the longitudinal force and yaw moment data to apply a correction to the received x direction force command Fx* and z moment command Mz* in a closed loop control system and outputs a corrected force command $Fx_c$ and a corrected turning moment command $Mx_c$ with reduced error. The use of closed loop feedback allows the error in steering and braking command signals to be minimized so that the braking and steering control system 100 functions more efficiently and accurately.

The closed loop feedback functionality of the feedback module 200 also enables the aircraft force and moment controller 104 to monitor loading of the undercarriages 10, 11, 12 and to control and limit the forces applied to each undercarriage. By monitoring and limiting the forces applied to each undercarriage 10, 11, 12, the feedback module 200 contributes to the structural integrity of the undercarriages, particularly in high braking force situations such as rejected take-off and in failure modes. Generally, aircraft undercarriages are significantly overdesigned to accommodate large variations in loading, particularly when an aircraft is operated in degraded conditions or failure modes. By improving the efficiency of undercarriage loading in normal and degraded operation and in failure modes, the invention reduces the design requirements for the undercarriages 10, 11, 12. The weight of the aircraft may, therefore, be reduced, thereby reducing fuel consumption.

The feedback module 200 is an "effective and predictive" feedback module because it provides the braking and steering control system 100 with information relating to the current effective performance of the undercarriages and the predicted maximum performance.

The feedback module 200 also outputs a signal representative of the health status of the braking and steering systems, indicating any component failures which have been reported to the feedback module by the HMS 201. Crew members may, for example, be informed of the health status via a display panel in the cockpit. The feedback module 200 therefore acts to increase aircraft crew and control system awareness of the operability of the steering and braking system and any specific failures which may affect ground maneuvers so that the crew and/or control systems can adapt their actions accordingly.

The feedback module 200 informs the pilot and co-pilot and the aircraft control systems of the current performance envelope of the aircraft. Crew members may, for example, be informed of the performance envelope via a display panel in the cockpit. In this way the aircraft crew and any control systems engaged during ground maneuvers may consider the current performance limitations of the aircraft and assess the ability of the aircraft to perform a certain maneuver before undertaking the maneuver. The feedback module therefore allows more efficient planning of ground maneuvers, and allows the aircraft crew and aircraft systems to modify an intended ground maneuver if it is found to be outside the aircraft's current performance envelope.

The aircraft crew and control systems are also updated with the current performance envelope of the aircraft 1 as it changes during ground maneuvers. Crew members may, for example, be informed of the performance envelope via a display panel in the cockpit. The crew members may therefore adapt their actions and commands in reaction to changing circumstances, and the control system may automatically limit the command signals as described above to ensure continued efficient operation of the undercarriages and successful completion of the maneuver. In this way the pilot's workload may be decreased as the aircraft's braking and steering control system 100 reacts to the dynamically changing performance envelope of the aircraft to maintain efficient braking and steering performance.

The feedback module or any of its specific functions may be enabled and disabled by the pilot, co-pilot or other aircraft control systems without affecting continuous operation of the undercarriages.

The skilled person will appreciate that the invention may equally be applied to any aircraft having any number of undercarriages in any configuration which are used for braking and/or steering, and is not limited in application to an aircraft having a landing gear or braking and steering control system as described above.

In an alternative embodiment, the feedback module may not be part of an integrated braking and steering control system. The feedback module may, for example, be part of a braking system which is not coupled to a steering system or a steering system which is not coupled to a braking system.

In an alternative embodiment, the feedback module may be used to monitor the performance of any one or more undercarriages of an aircraft, and may not be used to monitor the performance of all of an aircraft's undercarriages.

In an alternative embodiment, the feedback module may serve only to provide information, for example to inform aircraft crew members and/or ground crew members and/or other aircraft systems of the operating status of braking and/or steering system components, calculated performance limitations of aircraft landing gear or current performance of aircraft landing gear, and may not form part of a feedback loop in a control system.

In an alternative embodiment, the feedback module may be adapted to calculate only one of the maximum available braking force or the maximum available yaw moment to be generated by the undercarriages, and may be adapted to control only braking or only steering operations. In this case the feedback module may control and limit signals outputted to braking wheels only or to steering wheels only.

In an alternative embodiment the HMS 201 may not use correlation analysis but may use any method known from the prior art to establish the operability of any of the braking and steering system components or to establish the validity of any data received from landing gear sensors.

In an alternative embodiment, the feedback module may not cooperate with a health monitoring system. In this case, some or all of the function of the health monitoring system may be integrated with the feedback module 200. Alternatively, the feedback module may not be adapted to assess the fitness of particular components and systems or the validity of data representative of the operating characteristics of the undercarriages.

In an alternative embodiment, one or more of the undercarriages may have a bogie supporting a plurality of wheels on a plurality of axles.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been The invention is:

1. An aircraft system for controlling aircraft braking or steering, the aircraft system comprising:
   at least one undercarriage configured to brake or steer the aircraft; and
   a data processing unit configured to monitor the performance of the at least one undercarriage; and
   a control system adapted to output an output command to 1) at least one brake actuator to control an actuation of the at least one brake actuator and/or 2) at least one steering actuator to control an actuation of the at least one steering actuator,
   wherein the data processing unit is configured to receive data representative of operating characteristics of the at least one undercarriage and use the data to calculate a maximum achievable braking force and/or yaw moment to be generated by the at least one undercarriage.

2. The system according to claim 1, wherein the maximum achievable braking force and/or yaw moment represents an instantaneous performance envelope of the undercarriage.

3. The system according to claim 1 which is configured to use the data representative of the operating characteristics of the at least one undercarriage to calculate a total braking force and/or yaw moment being generated by the at least one undercarriage.

4. The system according to claim 1, wherein the data representative of the operating characteristics of the at least one undercarriage comprises data output by at least one sensor configured to measure the operating characteristics of the at least one undercarriage.

5. The system according to claim 1, wherein the calculated maximum achievable braking force and/or yaw moment is used to control or limit the output command.

6. The system according to claim 5, wherein the control system is configured to output the output command in response to an input command, wherein the calculated maximum achievable braking force and/or yaw moment is used to control or limit the input command.

7. The system according to claim 6, wherein the input command comprises 1) a deceleration or braking force command and/or 2) a yaw rate or yaw moment command.

8. The system according to claim 1, wherein the output command comprises at least one of a braking pressure command, a steering angle command, and a command to any other system used to control deceleration and/or yaw rate.

9. The system according to claim 1, wherein the data processing unit is configured to determine at least one of 1) the operability of at least one undercarriage component, 2) at least one system, and 3) the validity of any of the data representative of the operating characteristics of the at least one undercarriage.

10. The system according claim 9, wherein the data processing unit uses the determination of at least one of 1) the operability of the at least one undercarriage component and 2) at least one system in calculating the maximum achievable braking force and/or yaw moment.

11. The system according to claim 9, wherein the data processing unit is configured to generate or receive alternative data representative of at least one of the operating characteristics of the at least one undercarriage if any data representative of at least one of the operating characteristics is determined to be invalid, and to use the alternative data in the place of the invalid data when calculating the maximum achievable braking force and/or yaw moment.

12. The system according to claim 9, further comprising a memory for storing data representative of operating characteristics of the at least one undercarriage, wherein the data processing unit is configured to use the stored data in the place of the received data representative of operating characteristics of the at least one undercarriage if the received data is determined to be invalid.

13. The system according to claim 9, wherein the data processing unit is configured to provide to one or more persons and/or systems external to the data processing unit, information relating to at least one of 1) the operability of any undercarriage component or system and 2) the validity of any of the data representative of operating characteristics of the at least one undercarriage.

14. The system according to claim 1, wherein the control system is configured to output a plurality of signals for independently controlling the operation of a plurality of brake actuators and/or steering actuators.

15. The system according to claim 1, wherein the data processing unit may be enabled or disabled without disrupting the operation of at least one brake and/or at least one steering system.

16. A method for monitoring the performance of at least one aircraft undercarriage in an aircraft system for controlling braking and/or steering an aircraft, the method comprising:
    collecting data representative of operating characteristics of the at least one aircraft undercarriage and transmitting the data to a data processing unit;
    using the data transmitted to the data processing unit to calculate a performance envelope of the at least one aircraft undercarriage, the performance envelope being limited by the at least one undercarriage's maximum achievable braking force and/or yaw moment; and
    limiting the aircraft's ground maneuvers to be within the performance envelope of the at least one aircraft undercarriage.

17. The method according to claim 16, wherein the maximum achievable braking force and/or yaw moment represents an instantaneous performance envelope of the at least one aircraft undercarriage.

18. A method for controlling the performance of at least one aircraft undercarriage in an aircraft system for controlling braking and/or steering the aircraft, comprising:
    monitoring the performance of the at least one aircraft undercarriage by using a data processing unit to:
      receive data representative of operating characteristics of the at least one aircraft undercarriage; and
      use the data to calculate a maximum achievable braking force and/or yaw moment to be generated by the at least one undercarriage; and
    using the calculated maximum achievable braking force and/or yaw moment to control or limit an output command to 1) at least one brake actuator to control an actuation of the at least one brake actuator and/or 2) at least one steering actuator to control the actuation of the at least one steering actuator.

19. The method for controlling the performance of at least one aircraft undercarriage according to claim 18 wherein the output command comprises at least one of: a braking pressure command, a steering angle command, and a command to any other system used to control deceleration and/or yaw rate.

* * * * *